O. MOESSNER.
COMBINED BUSHING AND CLAMP FOR ELECTRIC CABLES.
APPLICATION FILED AUG. 6, 1913.
1,161,150.
Patented Nov. 23, 1915.
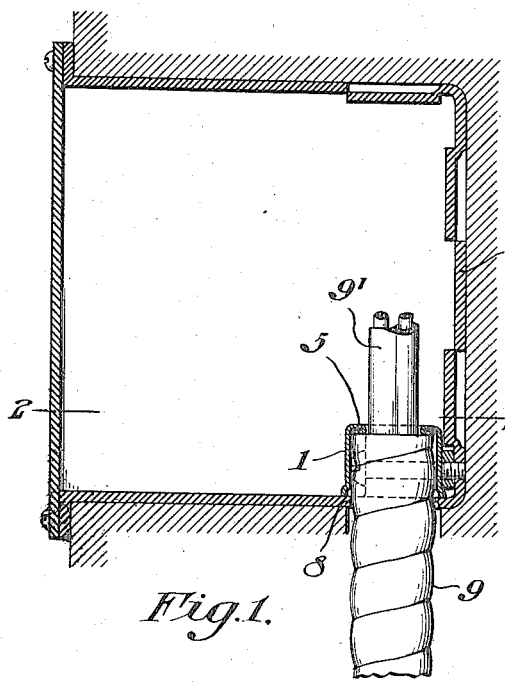
Fig. 1.
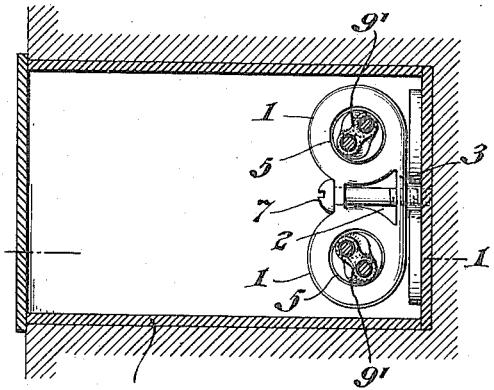
Fig. 2.
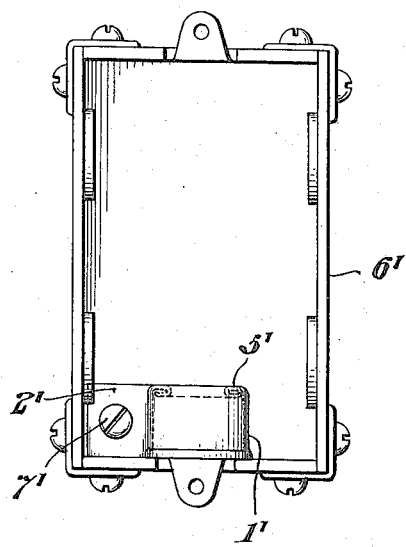
Fig. 4.
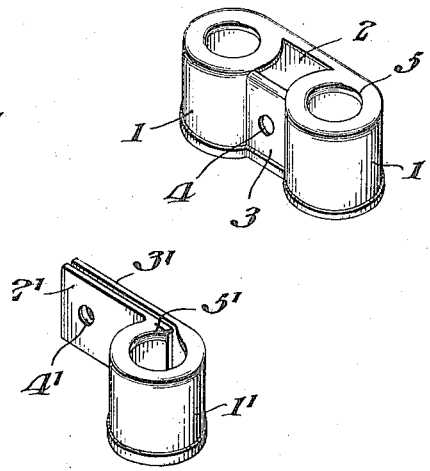
Fig. 3.
Fig. 5.
WITNESSES:
INVENTOR
Otto Moessner,
BY
Chas. N. Butler
ATTORNEY.

UNITED STATES PATENT OFFICE.

OTTO MOESSNER, OF PHILADELPHIA, PENNSYLVANIA.

COMBINED BUSHING AND CLAMP FOR ELECTRIC CABLES.

1,161,150.　　　　　Specification of Letters Patent.　　Patented Nov. 23, 1915.

Application filed August 6, 1913.　Serial No. 783,253.

*To all whom it may concern:*

Be it known that I, OTTO MOESSNER, a citizen of the United States, residing in the city of Philadelphia, county of Philadelphia, and State of Pennsylvania, have invented a Combined Bushing and Clamp for Electric Cables, of which the following is a specification.

My invention is designed to provide improved means for securing electric cables, particularly of the armored type, to outlet boxes and preventing the abrasion of the insulation of the electric wires.

In the accompanying drawings, Figure 1 is a sectional elevation of an outlet box, cable and connecting mechanism, taken on the line 1—1 of Fig. 2; Fig. 2 is a sectional view taken on the line 2—2 of Fig. 1; Fig. 3 is a perspective view of a detached clamp and bushing made in accordance with my invention; Fig. 4 is a part sectional elevation of an outlet box having a modified form of my improved clamp and bushing applied thereto; and Fig. 5 is a perspective view of the detached bushing which is shown in combination in Fig. 4.

As shown in Figs. 1, 2 and 3, the clamping and protecting device comprises the open bodies or cylindrical segments 1 having their extremities parallel to their axes or length. These bodies are connected by the webs 2 and 3 containing the holes 4, an end of each body being provided with the inwardly projecting circular flange or bushing 5 with rounded interior surface. This device is fixed in the outlet box 6 by the screw 7 which passes through the holes 4 and makes a threaded engagement with a wall of the box, the sockets formed by the parts 1 and 5 being placed in registration with the holes 8 of the box.

The covering or armor 9 of each cable passes through a hole 8 into a part 1 and the insulated conductor 9' within the armor passes through a bushing 5, the cable when thus placed being clamped by drawing up the screw 7 so as to cause the parts 1 to be firmly engaged to the covering or armor. As the inner edge of the bushing is rounded, suitably by turning in the sheet metal cut out in forming the hole therethrough, the covered conductors can be bent over the bushing without cutting the insulation thereon either by the bushing or the end of the armor since the bushing prevents sharp contact between the insulation and the end of the armor.

As illustrated in Figs. 4 and 5, the device may be made single, particularly where the cables are not arranged in parallel relation. The single device comprises an open body or cylindrical segment 1' having its extremities parallel to its length provided with the webs 2' and 3' containing holes 4', an end of the body 1' being provided with the open bushing 5' which is turned up from the metal of the body and has a rounded inner edge. This device is fixed to the outlet box 6' by the screw 7' which passes through the holes 4' into the box to fix the device in position and draw it up on the cable inserted therein.

It will be understood that the device, which is resilient, can be made of sheet metal pressed to shape by suitable dies, at small cost, and also that it is adapted for holding wire conduits of general character.

Having described my invention, I claim:

1. In a device of the character described, the combination with an outlet box, a clamp and bushing comprising an open resilient body with laterally projecting webs, an inturned flange extending transversely to said webs, and means passing through said webs for contracting said body and engaging it to said outlet box.

2. In a device of the character described, a clamp and bushing comprising a pair of open resilient bodies having inturned flanges at extremities thereof forming closed rings, webs connecting said bodies, and means for drawing said webs together whereby said bodies are adapted to be clamped on a cable.

3. In a device of the character described, a pair of open resilient bodies having inturned flanges at extremities thereof forming closed rings and webs connecting said bodies, said bodies and flanges providing sockets for wire conduits, and means for drawing said webs together so as to clamp said bodies on conduits therein.

In testimony whereof I have hereunto set my hand this 25th day of July, 1913, in the presence of the subscribing witnesses.

OTTO MOESSNER.

Witnesses:
　Jos. G. DENNY, Jr.,
　GEO. A. CUNNEY.